Feb. 22, 1938. H. A. HESS 2,109,424
BATTERY TERMINAL AND POST
Filed April 10, 1936
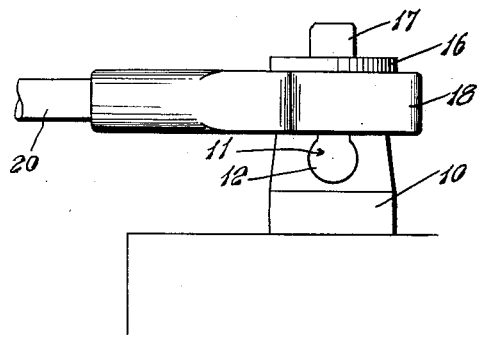
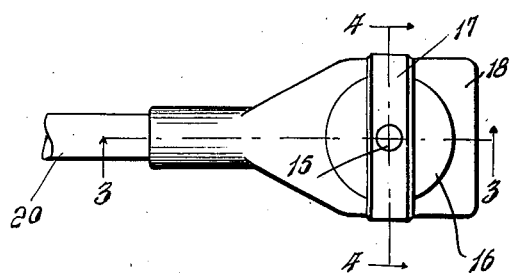
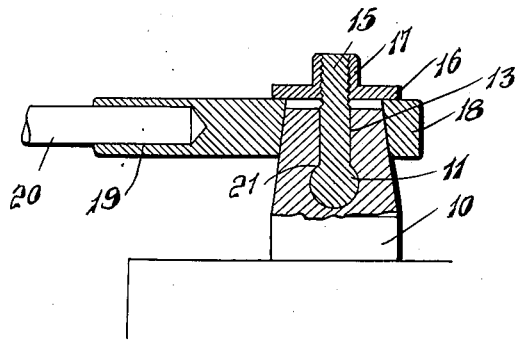
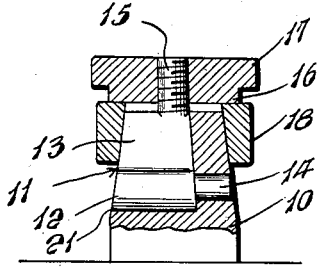
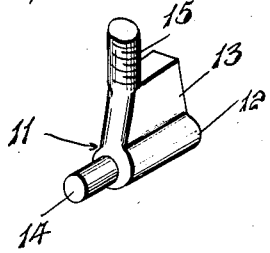
Inventor
HARRY A HESS.

Patented Feb. 22, 1938

2,109,424

UNITED STATES PATENT OFFICE 2,109,424

BATTERY TERMINAL AND POST

Harry A. Hess, Elcho, Wis., assignor of one-half to Ernest Foss, Elcho, Wis.

Application April 10, 1936, Serial No. 73,782

2 Claims. (Cl. 173—259)

My invention relates to battery posts and means to secure cable sockets thereto. It is customary in the ordinary storage battery, such as used on automobiles, to attach the cables to the posts by split sockets that are slipped over the post and held in position by a nut and bolt.

The main object of my invention is to avoid the use of this old form of cable socket which is often very difficult to remove from the post after it has become corroded. I intend to do this by providing an insert that can be placed in a recess provided therefor in a portion of the post. This insert has a threaded bolt at the top to receive a nut with an enlarged base that will hold a cable socket in position on the post.

Another object of my invention is to have the post slightly reduced in circumference near the top so that the cable socket will be securely held against any movement on the post by being wedged against the post by the pressure of the nut.

Another object of my invention is to provide a modified nut that may be operated without the use of a tool, so that no tools will be required to attach or detach the cables.

Other objects and advantages of my invention will become apparent from the description of the accompanying drawing.

Referring to the drawing:—

Figure 1 is a side view in elevation of the device assembled;

Figure 2 is a top plan view of the assembled device;

Figure 3 is a sectional view taken on the line 3—3 of Figure 2;

Figure 4 is a sectional view taken on the line 4—4 of Figure 2; and

Figure 5 is an enlarged perspective view of the insert.

Referring more particularly to the drawing, the battery post 10 is such as is used with any of the common types of electric storage batteries, (not shown). The post 10 has a recess therein to receive an insert 11. The insert 11 is composed of a cylindrical-shaped portion 12, a shank 13, a pin 14, and a bolt 15. The bolt 15 is threaded to receive a modified nut having an enlarged base 16 and a cross piece 17. The post 10 is reduced at the top to receive a cable socket 18 which is wedged down upon the post 10 by the nut 16 being tightened upon the bolt 15. This holds the socket 18 tight on the post 10. The cross piece 17 is to permit the nut to be attached or detached from the bolt 15 without the use of a wrench. The cross piece 17 acts as a finger grip.

The insert 11 is held in the recess of the post 10 by the wall of the socket 18 which engages the outside face of the shank 13 when the socket is in position on the post. It is therefore impossible to remove the insert 11 until the socket 18 has first been removed.

The socket 18 has a recess 19 to receive a cable 20. The cable may be secured in the recess by any appropriate means.

Shoulders 21 prevent the insert from moving up and out of the recess when the nut 16 is tightened on the bolt 15.

In operation the insert having been slipped into the recess in the post the socket is then placed upon the post. The insert will be held tight in the recess by the socket. The nut is then screwed down upon the threaded bolt 15 and the device is completely assembled.

To remove the cable the finger grip 17 is grasped to unscrew the nut. The nut having been removed the cable socket can then be slipped off the post. The device will of course be used upon both posts of the ordinary storage battery.

It is to be understood that modifications can be made without departing from the spirit and scope of the invention, the foregoing presentation merely being the preferred embodiment of the invention.

I claim as my invention:—

1. A device of the class described, comprising a battery post having a recess in the top thereof, a removable insert carried by said post and having an enlarged base, the lower portion of said recess being enlarged to receive said enlarged base, threaded means on said insert to receive a nut to hold a cable socket on said post, and said insert having one edge in engagement with said socket to prevent removal of said insert while the socket is on the post.

2. In a device of the class described, a battery post having a recess formed therein and opening at the top and side thereof and provided with an enlarged base, an insert formed to fit said recess and to be mounted therein and provided with an enlarged base engaging the base of the recess to prevent vertical movement of the insert when in position, a cable socket mounted on said post, said insert having one edge in engagement with said socket to prevent lateral movement of the insert, a threaded member projecting from the top of said insert, and a nut engaging said threaded member and bearing against said socket to hold it on said post.

HARRY A. HESS.